United States Patent
Sarraf et al.

(10) Patent No.: US 11,572,198 B2
(45) Date of Patent: Feb. 7, 2023

(54) MODULAR POWER CHARGING UNIT FOR RETROFITTING EXISTING AIRCRAFT MONUMENTS

(71) Applicant: Airworthy, Inc., Anaheim, CA (US)

(72) Inventors: Abraham Sarraf, Chula Vista, CA (US); Vang Her, Trabuco Canyon, CA (US)

(73) Assignee: Airworthy, Inc., Anaheim, CA (US)

( * ) Notice: Subject to any disclaimer, the term of this patent is extended or adjusted under 35 U.S.C. 154(b) by 382 days.

(21) Appl. No.: 16/821,580

(22) Filed: Mar. 17, 2020

(65) Prior Publication Data

US 2020/0307794 A1 Oct. 1, 2020

Related U.S. Application Data

(60) Provisional application No. 62/824,957, filed on Mar. 27, 2019.

(51) Int. Cl.
*B64F 5/10* (2017.01)
*H02J 7/00* (2006.01)

(52) U.S. Cl.
CPC .............. *B64F 5/10* (2017.01); *H02J 7/0045* (2013.01); *H02J 7/0047* (2013.01); *B23P 2700/01* (2013.01)

(58) Field of Classification Search
CPC ....... B64F 5/10; B23P 2700/01; H02J 7/0045; H02J 7/0047
See application file for complete search history.

(56) References Cited

U.S. PATENT DOCUMENTS

| | | |
|---|---|---|
| 8,128,027 B2 | 3/2012 | Lee |
| 9,481,332 B1 | 11/2016 | Lee |
| D788,017 S | 5/2017 | Smallhorn |
| 9,809,311 B2 | 11/2017 | Young et al. |
| 9,960,624 B2 | 5/2018 | Ibrahim |
| 2008/0001583 A1 | 1/2008 | Brown et al. |
| 2011/0184579 A1 | 7/2011 | Nilsen et al. |
| 2013/0333940 A1 | 12/2013 | Stencil |

*Primary Examiner* — Nirvana Deonauth
(74) *Attorney, Agent, or Firm* — Loza & Loza, LLP; David S. Sarisky

(57) ABSTRACT

A system for retrofitting a wall of an aircraft monument includes a modular power charging unit and mounting hardware. The modular power charging unit includes a housing containing an electrical port component, a cable harness, and a switch. The housing has a plurality of screw holes and a back panel having an opening through which the cable harness extends. The mounting hardware includes a plurality of threaded inserts, each configured to be inserted into one of a plurality of mounting holes formed in the wall, and a plurality of screws, each configured to extend through a screw hole of the housing and into a threaded insert. The housing is configured to be secured to a first side of the wall so that the entirety of the housing projects outward from the first side and only the cable harness extends through a cable-harness hole formed through a thickness of the wall.

11 Claims, 7 Drawing Sheets

MODULAR POWER CHARGING UNIT FOR RETROFITTING EXISTING AIRCRAFT MONUMENTS

CROSS-REFERENCE TO RELATED APPLICATION

This application claims the benefit of and priority to U.S. Provisional Patent Application Ser. No. 62/824,957, filed Mar. 27, 2019, for "Modular Electrical Unit For Retrofitting Existing Aircraft Monuments", the entire disclosure of which is incorporated herein by reference.

BACKGROUND

As portable mobile electronic devices become more pervasive to use for airline personal to communicate and provide instructions to cabin catering, and to sell services onboard, the need for aircraft monuments with power supplies to charge those devices has become apparent. This need has introduced a service gap with existing aircraft monuments that were deployed prior the recent technology trends. Accordingly, there is a need to retrofit existing aircraft monuments to include power charging units. There is a further need for power charging units that are configured to enable retrofitting of components, e.g., walls, doors, etc., of these aircraft monuments in a way that does not compromise the structural integrity of the monuments to a degree that negatively affects the airworthiness certification of the monuments.

SUMMARY

Disclosed herein is a system for retrofitting a wall of an aircraft monument that is certified to withstand a load in a range of 1 g-force (g) and 9 g. The system includes a modular power charging unit and mounting hardware. The modular power charging unit includes a housing containing at least a portion of an electrical port component, a cable harness, and a switch. The housing has a plurality of screw holes and a back panel having an opening through which the cable harness extends. The mounting hardware includes a plurality of threaded inserts, each configured to be inserted into one of a plurality of mounting holes formed in the wall, and a plurality of screws, each configured to extend through a screw hole of the housing and into a threaded insert. The housing is configured to be secured to a first side of the wall so that the entirety of the housing projects outward from the first side and only the cable harness extends through a cable-harness hole formed through a thickness of the wall. Because the housing is configured to be secured in place on one side of the wall and only the cable harness extends through the wall, structural modification of the wall during retrofitting is limited to a single, small hole through the wall and a plurality of even smaller mounting holes into, but not necessarily through, the wall. As such, the structural integrity of the wall and the aircraft monument is preserved.

In additional aspects of the system, the housing includes a grommet surrounding the opening of the back panel through which the cable harness extends. The grommet has a maximum cross sectional dimension that enables placement of the grommet into a cable-harness hole through the wall. The cable-harness hole has a maximum cross sectional dimension that is small enough to preserve the structural integrity of the wall and the aircraft monument. In another aspect, the plurality of threaded inserts has a length less than the thickness of the wall to prevent mounting hardware, e.g., screws, from extending through the entire thickness of the wall.

In other aspects related to the modular power charging unit, the electrical port component may be a charging interface, or a power and electrical power outlet. The modular power charging unit may further include an indicator light electrically associated with the electrical port component and configured to illuminate only when the modular power charging unit is in a power on state.

Disclosed herein is a method of mounting a modular power charging unit to an aircraft monument that is certified to withstand a load in a range of 1 g and 9 g. The method includes forming a cable-harness hole through an entire thickness of a wall of the aircraft monument. The size of the cable-harness hole is large enough to allow for a portion of a cable harness of the modular power charging unit to pass through. The size and location of the cable-harness hole relative to the edges of the wall preserves the structural integrity of the wall and the aircraft monument. The method further includes forming a plurality of mounting holes in the wall, and inserting a threaded insert in each of the plurality of mounting holes. The size and location of each of the plurality of mounting holes relative to the edges of the wall preserves the structural integrity of the wall and the aircraft monument. To further preserve the structural integrity of the wall and the aircraft monument, the plurality of mounting holes may extend only partially into the wall. The method also includes feeding the portion of the cable harness of the modular power charging unit through the cable-harness hole. Next, the method includes aligning each of a plurality of screw holes of a housing of the modular power charging unit with a screw hole having a threaded insert and inserting mounting hardware through each screw hole and into the threaded insert; and then advancing the mounting hardware into the threaded inserts until a back panel of the housing is flush with a surface of the wall.

In additional aspects of the method, the cable-harness hole is located a distance from a closest edge of the wall. The distance is equal to at least one times the diameter of the cable-harness hole. In another aspect, the threaded insert is formed of a rigid metal configured to provide structural support to the wall in an area of the plurality of mounting holes. In yet another aspect, the housing includes a grommet that projects outward from the back panel. The grommet has a maximum cross sectional dimension that enables placement of the grommet into the cable-harness hole through the wall. The cable-harness hole has a corresponding maximum cross sectional dimension that preserves the structural integrity of the wall and the aircraft monument.

Disclosed herein is a modular power charging unit for mounting to a wall of an aircraft monument that is certified to withstand a load in a range of 1 g and 9 g. The modular power charging unit includes an electrical port component having a power input terminal and a ground terminal, a cable harness having a power input pin and a ground pin configured to couple to an external power supply, a manually operable switch electrically interposed between the power input terminal of the electrical port component and the power input pin of the cable harness, and a housing containing at least a portion of the electrical port component, the cable harness, and the manually operable switch. The manually operable switch is configured to toggle the modular power charging unit between a power on state where the power input pin is electrically coupled to the power input terminal, and an off state where the power input pin is electrically decoupled from the power input terminal. The housing is configured to be secured to a first side of the wall so that the entirety of the housing projects outward from the first side.

In additional aspects, the modular power charging unit also includes an indicator light electrically associated with the electrical port component and configured to illuminate only when the modular power charging unit is in the power on state. In other aspects of the modular power charging unit, the electrical port component may be a charging interface and/or an electrical power outlet.

In additional aspects of the modular power unit, the housing includes a back panel with an opening through which the cable harness extends to place the power input pin and the ground pin outside of the housing. The housing is secured to the wall by mounting hardware, e.g., screws, that extends into mounting holes formed in the wall so that the back panel is flush with a surface of the wall. The mounting holes may extend only partially into the wall to further preserve the structural integrity of the wall. The housing includes a grommet surrounding the opening of the back panel, and the grommet has a maximum cross sectional dimension that enables placement of the grommet into a cable-harness hole through the wall, where the cable-harness hole has a maximum cross sectional dimension that preserves the structural integrity of the wall and the aircraft monument.

Thus disclosed herein is a modular power charging unit that expands the capability of existing aircraft monuments. The module power charging unit (MPCU) provides a convenient add-on system that efficiently adds additional, scalable, power interfaces to existing aircraft monuments. The MPCU is configured to require minimal modification of aircraft monument structures, e.g., walls, so that aircraft structural load certifications are not compromised.

BRIEF DESCRIPTION OF THE DRAWINGS

Various aspects of apparatuses and methods will now be presented in the detailed description by way of example, and not by way of limitation, with reference to the accompanying drawings, wherein.

DETAILED DESCRIPTION

A typical aircraft includes a fuselage, which generally corresponds to the main body of the aircraft for holding passengers, crew, cargo, and/or equipment. Typically, the fuselage of an aircraft is elongate and somewhat cylindrical or tubular. The fuselage may include one or more personal spaces, such as one or more crew rests, lavatories, private suites, galley areas, and/or a cockpit. One or more aircraft monuments, e.g., galleys, closets, etc., may be located within such personal spaces.

Aircraft monuments are structurally certified pursuant to one or more of the airworthiness standards with respect to static loads, as specified in 14 CFR Part 25, which is hereby incorporated by reference. For example, an aircraft monument in the form of a galley must be certified to withstand specified load requirements. An aircraft monument is generally considered to withstand load requirements when no component part of the monument, such as a monument wall, detaches from the overall monument while being subjected to a test load. Bending, cracking and deforming of component parts are generally acceptable and the occurrence of one or more of these does not negatively affect the certification of a monument.

Subsequent modification of a component part of an aircraft monument may structurally compromise the entire aircraft monument. For example, a large hole formed through a monument wall of the aircraft monument may cause that wall to become detached if the monument were to be subjected to the test load it was originally certified under. Accordingly, when retrofitting an aircraft monument it is desirable to minimize the amount and types of modifications made to the component parts of the monument; otherwise the structural integrity of the aircraft monument may be affected to a degree that renders the monument no longer structurally certified pursuant to one or more of the airworthiness standards with respect to static loads, as specified in 14 CFR Part 25.

Modular power charging units for retrofitting existing aircraft monuments and related methods of retrofitting monuments in a way that preserves certification of the monument are disclosed herein. A modular power charging unit includes at least one electrical port component, which may be, for example, a power outlet or a charging interface. A charging interface may comprise, for example, one or more of a USB port, a micro-USB port, a Lightening port, and any other type of power/charging port. These modular power charging units allow for retrofitting of existing aircraft monuments to provide power outlets and charging interfaces in locations where they are not currently located and in a way that does not reduce the integrity of the monuments to a degree that would require recertification of the monument.

Figure 1A:
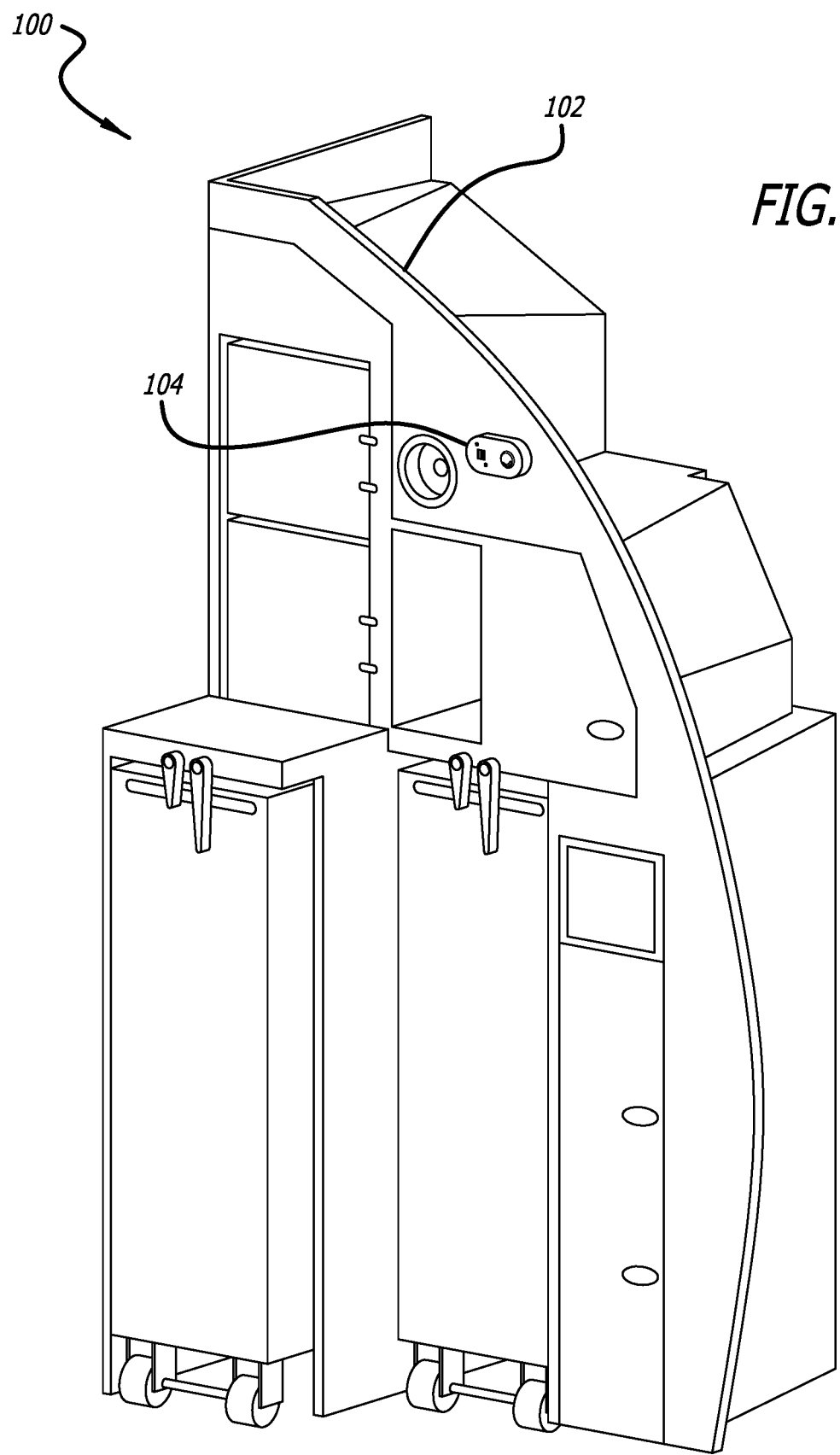
FIG. 1A is illustration of an aircraft monument in the form of a galley having a vertical wall that is retrofitted to include a modular power charging unit.
Figure 1B:
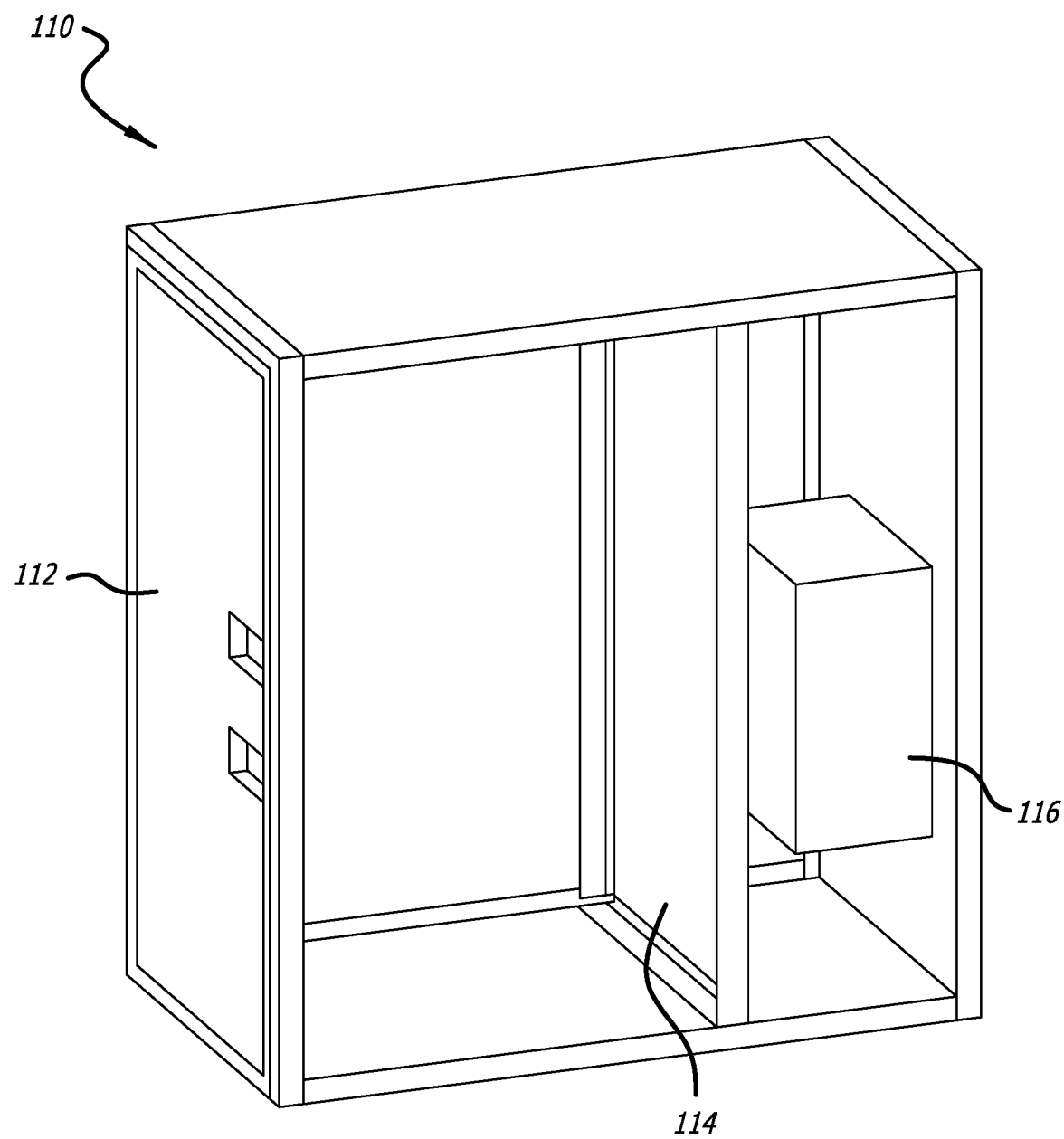
FIG. 1B is illustration of an aircraft monument in the form of a storage closet having a vertical wall that is available for retrofitting with a modular power charging unit.
Figure 2:
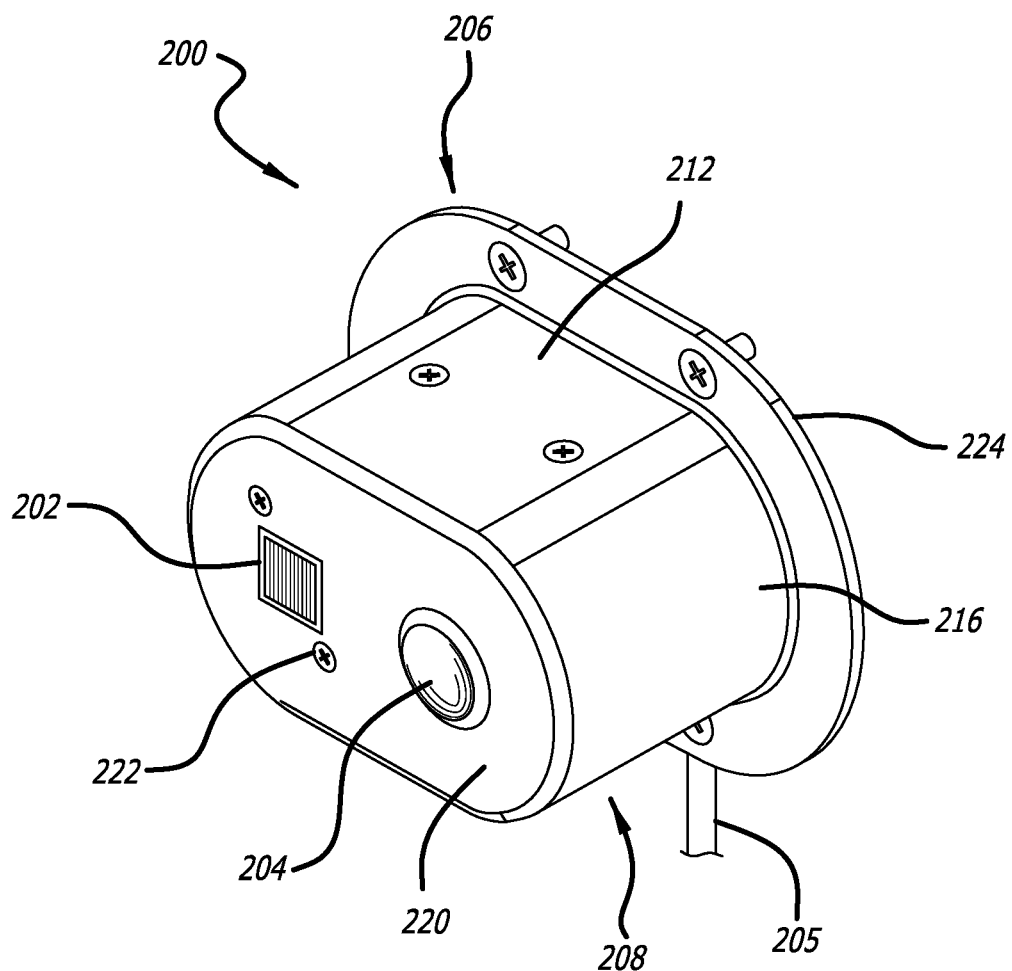
FIG. 2 is an illustration of one configuration of a modular power charging unit that includes a dual USB port with power indicators and a power switch for turning the dual USB port on and off.

With reference to FIG. 1A, an aircraft monument 100 in the form of a galley has a monument wall 102 that is retrofitted to include a modular power charging unit (MPCU) 104. The MPCU 104 electrically couples to an AC-to-DC converter (not shown) located near the galley. Prior to being retrofitted with the MPCU 104, the galley 100 was structurally certified pursuant to one or more of the airworthiness standards with respect to static loads, as specified in 14 CFR Part 25. With reference to FIG. 1B, another aircraft monument 110 in the form of a storage closet has a door wall 112 that is available for retrofitting with a MPCU (not shown). The MPCU unit may be installed on the exterior side of the door wall 112 or the interior side. The aircraft monument 110 includes a false wall 114 behind which is located an AC-to-DC converter 116 that is available to supply power to the MPCU.

The MPCUs disclosed herein are designed to allow for integration into existing aircraft monuments in a manner that does not affect the structural integrity of the component part, e.g., monument wall, to which it is mounted, and thus does not affect the structural integrity of the monument. To this end, the MPCUs are configured to be secured to a wall of an aircraft monument in a manner that requires the formation of a single, small hole through the thickness of the wall. Requiring only a single, small hole through the wall preserves the structural integrity of the wall and the entire aircraft monument. The back panel of the MPCU is secured flush against a surface of the monument wall so that the entirety of the MPCU housing is on the front or exterior side of the wall and projects outward from the wall, and the only part of the MPCU that extends through the back or interior side of the wall is a cable harness.

With reference to FIGS. 2, 3A, 3B and 4, one configuration of a MPCU 200 includes electrical components comprising an electrical port component 202, e.g., a dual USB port with power indicators, a power switch 204, and an electrical cable harness 205. The MPCU 200 is configured for mounting to a wall of an aircraft monument that is configured and certified to withstand static loads pursuant to 14 CRF Part 25 requirements. For example, a galley monument such as shown in FIG. 1A may be required to withstand a static load in the range of 1 g-force (g) to 9 g.

The MPCU 200 includes a housing 206 having a container portion 208 that contains all or at least a portion of the electrical components of the MPCU, and a cover portion 210 that couples to the container portion to enclose parts of the electrical components inside the housing. The container portion 208 and the cover portion 201 may be formed of plastic. The container portion 208 has a top panel 212, a bottom panel 214, two side panels 216, 218, and a front panel 220 through which the electrical port component 202 and power switch 204 are exposed. A pair of screws 222 secure the electrical port component 202 to the front panel 220 of the housing 206. A flange 224 extends around the perimeter of the container portion 208. The flange 224 has four screw holes 226 for receiving mounting hardware, e.g., screws, that are used to secure the MPCU 200 to a monument wall.

Figure 4:
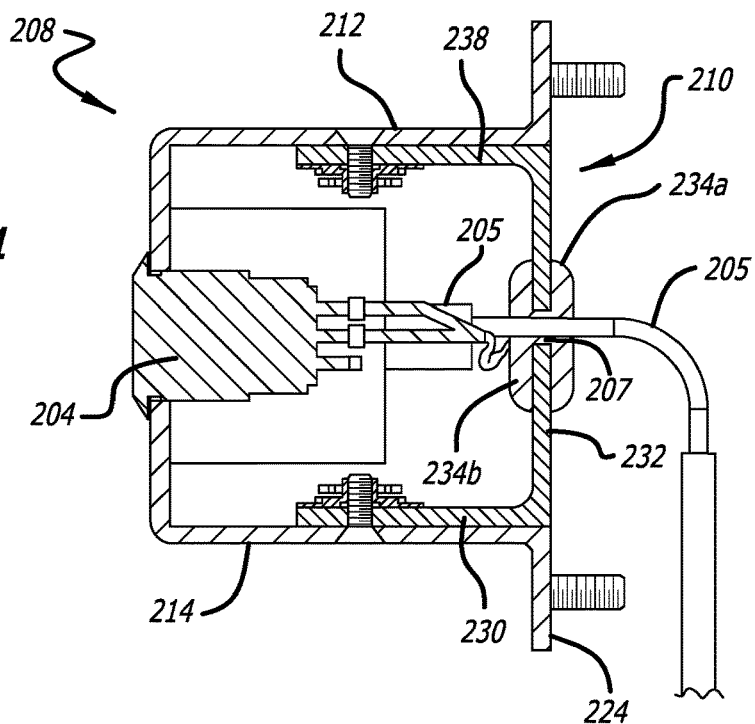
FIG. 4 is a cross-sectional side view of the modular power charging unit of FIG. 2.

The cover portion 210 includes a top panel 228, a bottom panel 230 and a back panel 232. The back panel 232 includes a hole or opening 207 through which the electrical cable harness 205 extends. As shown in FIG. 4, a pair of grommets 234a, 234b surrounds the portion of the electrical cable harness 205 near the back panel 232. The grommets 234a, 234b are flush with opposite sides of the back panel 232 and secure the electrical cable harness 205 in place relative to the opening 207 and the back panel 232.

The cover portion 210 is sized to fit into the container portion 208 such that the top panel 228 and bottom panel 230 are respectively in abutting contact with the top panel 212 and bottom panel 214 of the container portion, and the back panel 232 is generally flush with the back side of the flange 224. As shown in FIG. 4, the cover portion 210 is secured to the container portion 208 by two screws extending through the respective top panels 212, 228 and two screws extending through the respective bottom panels 214, 230.

Figure 5A:
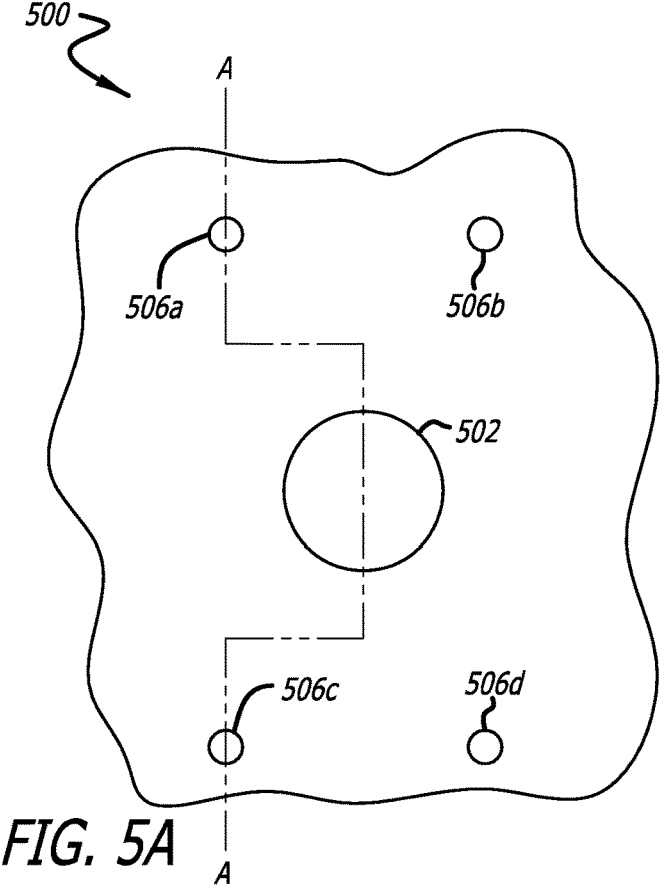
FIG. 5A is a plan view of a section of a monument wall having a cable-harness hole formed therethrough and four mounting holes formed therein for purposes of electrically coupling the modular power charging unit to a power unit and for securing the modular power charging unit to the wall.
Figure 5B:
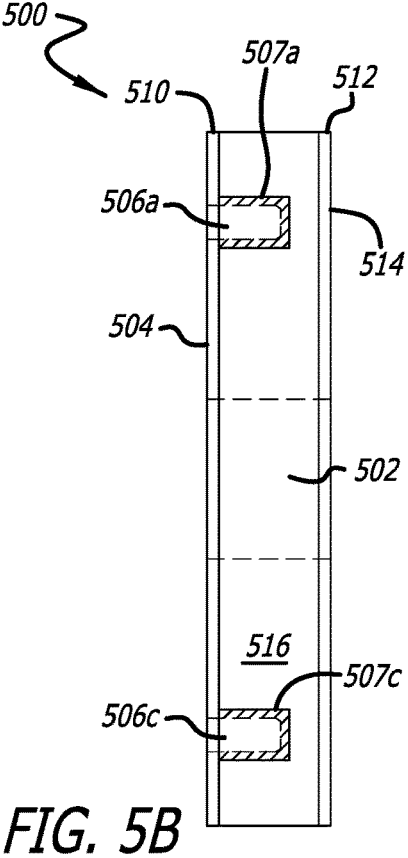
FIG. 5B is a cross-sectional, side view of the section of the monument wall of FIG. 5A along line A-A.
Figure 6:
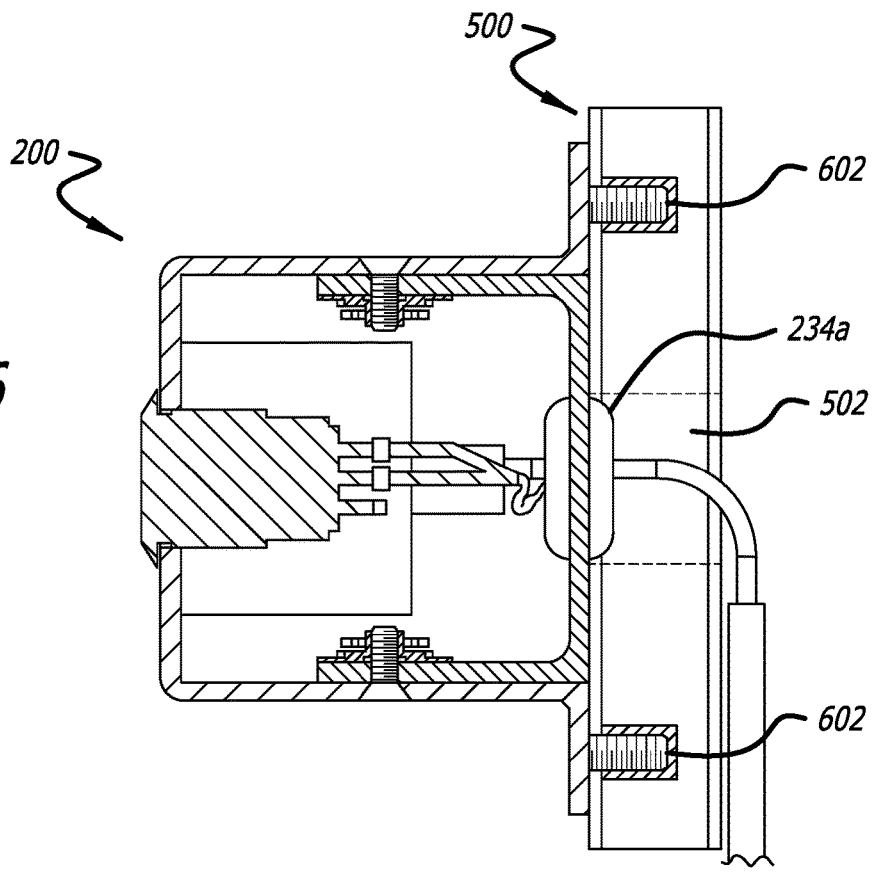
FIG. 6 is a side view of the modular power charging unit of FIG. 4 secured to the monument wall of FIGS. 5A and 5B.

With reference to FIGS. 5A, 5B and 6, an existing monument wall 500 is retrofitted with an MPCU 200 as follows:

1) A cable-harness hole 502 is formed through an entire thickness of the monument wall 500. The cable-harness hole 502 is sized such that it does not affect the structural integrity of the monument wall 500 to a degree that negatively affects the certification of the wall and the aircraft monument of which the wall is a part. The cable-harness hole 502 is also located a distance from the edges of the monument wall 500 such that it does not affect the structural integrity of the wall. The cable-harness hole 502 is preferably no more than 3 inches in diameter, and in one configuration is 1 inch in diameter; and is preferably located a distance from the closest edge of the wall that is equal to 1 times the diameter of the cable-harness hole 502. The cable-harness hole 502 is also preferably sized to match the outer diameter d of the grommet 234a. As shown in FIG. 6, this sizing of the cable-harness hole 502 allows for the grommet 234a to extend into the hole, which in turn allows for the back panel 232 of the MPCU 200 to be flush with a first surface 504 of the monument wall 500.

Figure 3A:
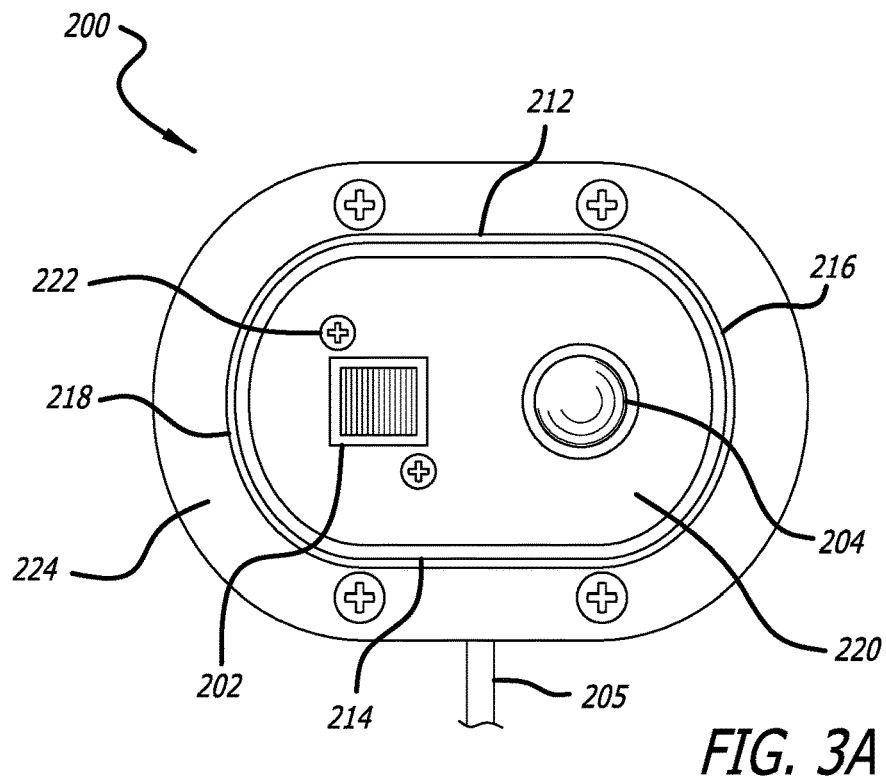
FIG. 3A is an illustration of the modular power charging unit of FIG. 2 from the front.
Figure 3B:
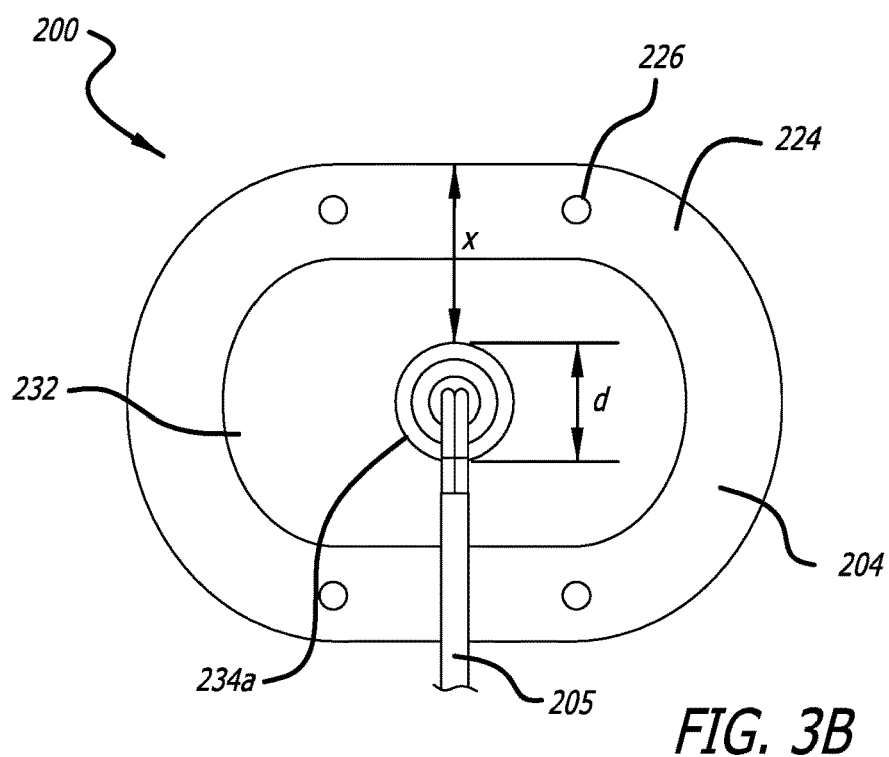
FIG. 3B is an illustration of the modular power charging unit of FIG. 2 from the rear, showing an electrical cable harness extending through the back panel of the modular power charging unit.

With reference to FIG. 3B, in one embodiment, the MPCU 200 is configured so that the minimum distance x between the outer edge of the grommet 234a and the outer edge of the flange 224 of the housing 206 is at least 1 times greater than the diameter d of the grommet 234a. This ensures that the cable-harness hole 502 sized to receive the grommet 234a will be formed a sufficient distance from the edge of a monument wall 500 to preserve the certification of the wall and the aircraft monument of which the wall is a part, even if an outer edge of the housing 206 is positioned at the edge of the wall.

2) Four mounting holes 506a-d are drilled into the monument wall 500. The mounting holes 506a-d may extend partially through the wall. For example, as a general rule, the depth of the mounting holes 506a-d are no more than one times the diameter of the mounting holes. Alternatively, the mounting holes 506a-d may extend completely through the monument wall 500. In either case (partial or complete extension through the monument wall 500), a rigid metal threaded insert 507a-d is inserted into the mounting holes 506a-d and secured therein by adhesive. These threaded inserts 507a-d are sized to receive the mounting screws of the MPCU 200, and serve to strengthen the monument wall 500 in the regions of the mounting holes 506a-d, thus negating any degradation of the wall strength that would otherwise result from the mounting holes themselves.

3) Once the cable-harness hole 502 and the mounting holes 506a-d are formed and threaded inserts 507a-d are inserted in the mounting holes, the MPCU 200 is held in the area of the mounting holes and the portion of the electrical cable harness 205 extending from the back of the MPCU is fed through the cable-harness hole. As shown in FIG. 6, the MPCU 200 is then secured to the monument wall 500 using four screws 602 sized to engage the threaded inserts 507a-d in the wall. As the screws 602 are tightened and the back of the MPCU 200 becomes positioned parallel with the monument wall 500, the grommet 234a becomes aligned with the cable-harness hole 502. As the screws are further tightened, the grommet 234a extends into the cable-harness hole 502 and the back of the MPCU 200 becomes flush mounted to the monument wall 500. The threaded inserts 507a-d are of a length/depth that prevents the mounting hardware (screws) from extending through the entire thickness of the monument wall 500.

Figure 7:
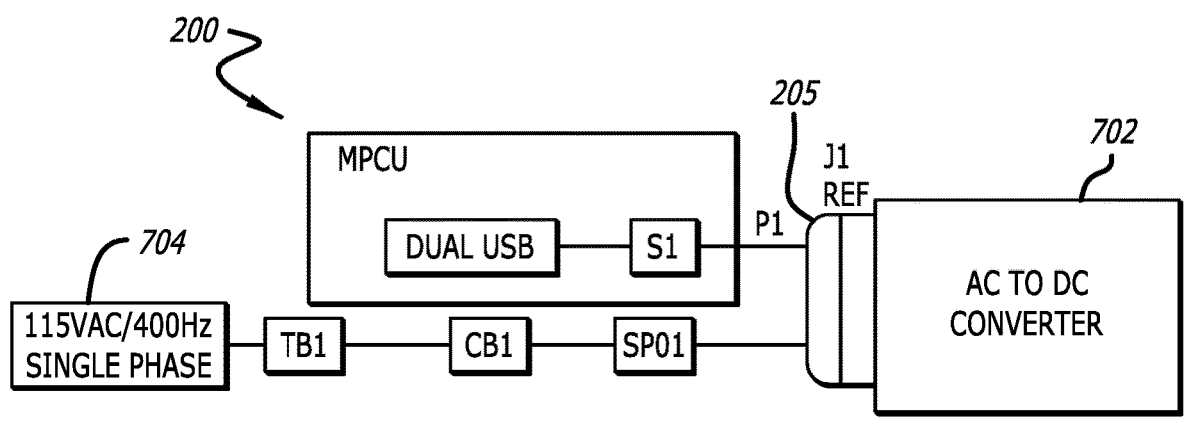
FIG. 7 is a functional block diagram of a modular power charging unit coupled to a power source of the aircraft.

4) The exposed end of the electrical cable harness 205 is then electrically coupled to an appropriate power supply located in the aircraft near the MPCU 200. With reference to FIG. 7, in the case of an MPCU 200 that includes a USB charging port, the electrical cable harness 205 is coupled to an AC to DC converter 702, which in turn, is coupled to a 115 volt AC power source 704. In cases where the MPCU 200 includes an electrical outlet, the cable harness 205 may be directly coupled to the 115 volt AC power source 704.

With reference to FIG. 5B, the monument wall 500 may include a first skin layer 510 having a first surface 504, a second skin layer 512 having a second surface 514, and a core 516 extending between the first surface and second surface, such that first skin layer and second skin layer are positioned on opposites sides of the core. The first skin layer 510 may be arranged such that first surface 504 faces outwardly and away from the core 516. Similarly, the second skin layer 512 may be arranged such that second surface 514 faces outwardly and away from the core 516. The thickness of the monument wall 500 may be, for example, in the range of 1 to 3 inches.

The monument wall 500 may be formed of any suitable materials, having a flexible, rigid, or semi-rigid first skin layer 510, and a flexible, rigid, or semi-rigid second skin layer 512, and core 516 therebetween. Generally, the first skin layer 510 and the second skin layer 512 may be relatively thin sheets or plates, while core 516 may have a thickness that is significantly greater than the respective thicknesses of first skin layer and second skin layer. In some examples, the density of core 516 may be less than that of first skin layer 510 and second skin layer 512.

The monument wall 500 may be, for example, a honeycomb core sandwich panel, but other constructions are contemplated within the scope of the present disclosure. The first skin layer 510 and the second skin layer 512 may be, for example, aluminum sheets, or may be formed of one or more layers or plys of composite materials (e.g., fiber-reinforced polymers). In some examples, the core 516 may be formed of a plurality of longitudinally-extending open cells of any shape, and formed of any material, such as aluminum, Nomex®, or other lightweight material. In some examples, the core 516 may be formed of foamed material, or low-density materials, such as balsa wood or polystyrene.

Figure 8:
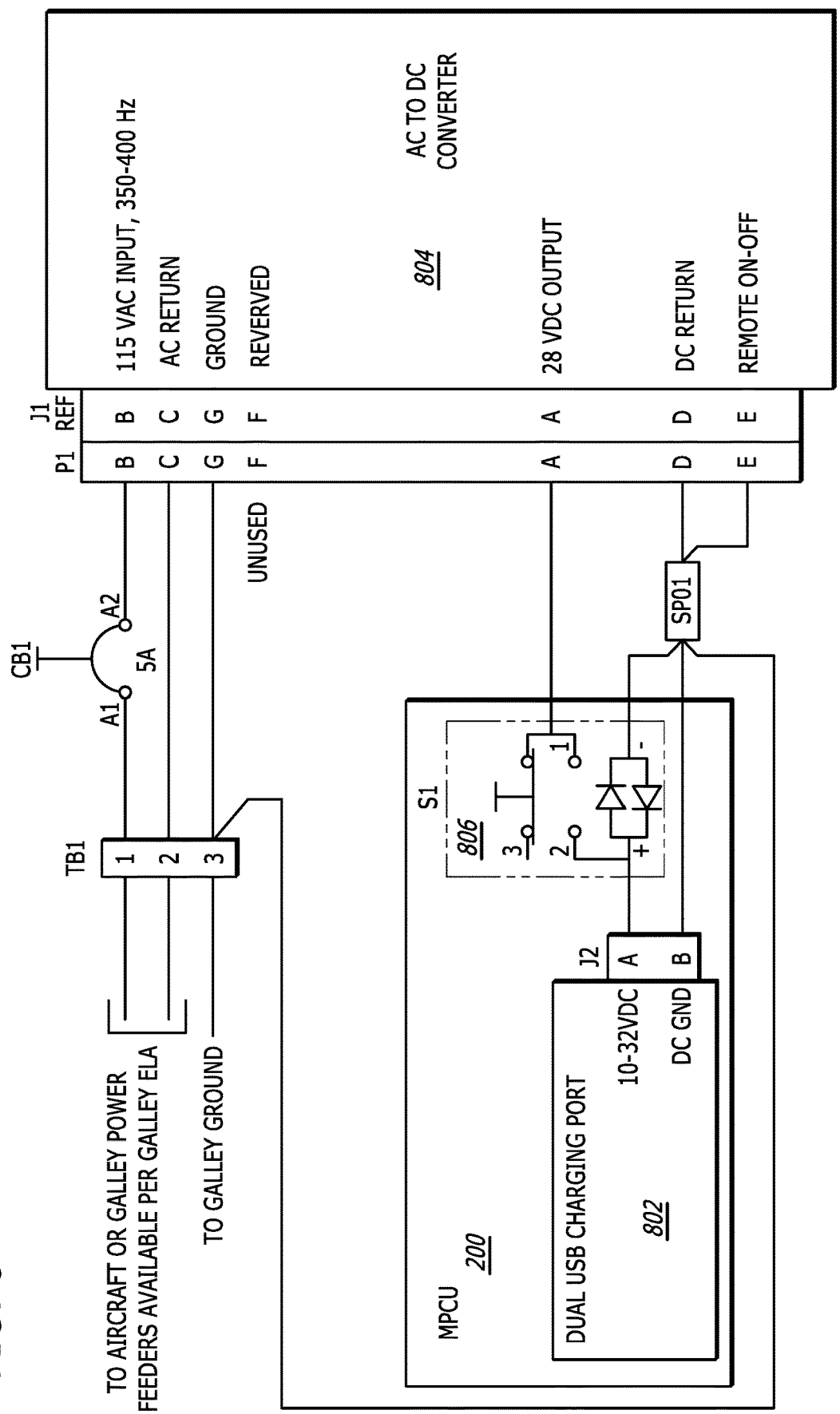
FIG. 8 is an electrical diagram of a modular power charging unit coupled to a power source of the aircraft.

With reference to FIG. 8, in one configuration the MPCU 200 includes a USB charging port 802 that is electrically coupled to a 28 VDC output line, a DC return line and a remote on-off line of an AC to DC converter 804. While the USB charging port 802 is directly coupled to the DC return line and a remote on-off line, the port is also coupled to the 28 VDC output through a manual switch 806 to allow for local turning on an off of the USB charging function. An indicator light associated with the USB charging port 802 illuminates when power is being supplied to the port. While conventional USB charging ports do not include on/off switches and indicator lights, these components are necessary in order to satisfy FAA safety standards that require the ability to manually shut off power to electrical outlets and ports and the ability to visually confirm via an indicator light that power is off.

Disclosed herein is a system for retrofitting a wall 500 of an aircraft monument 100, 110 that is certified to withstand a load in a range of 1 g-force (g) and 9 g. The system includes a modular power charging unit 200 and mounting hardware. The modular power charging unit 200 includes a housing 206 containing at least a portion of an electrical port component 202, an electrical cable harness 205, and a power switch 204. The housing 206 has a plurality of screw holes 226 and a back panel 232 having an opening 207 through which the electrical cable harness 205 extends. The mounting hardware includes a plurality of threaded inserts 507a-d, each configured to be inserted into one of a plurality of mounting holes 506a-d formed in the wall 500, and a plurality of screws 602, each configured to extend through a screw hole 226 of the housing 206 and into a threaded insert 507a-d. The housing 206 is configured to be secured to a first side of the wall 500 so that the entirety of the housing projects outward from the first side and only the electrical cable harness 205 extends through a cable-harness hole 502 formed through a thickness of the wall. Because the housing 206 is configured to be secured in place on one side of the wall 500 and only the cable harness extends through the wall, structural modification of the wall during retrofitting is limited to a single, small cable-harness hole 502 through the wall and a plurality of even smaller mounting holes 506a-d into, but not necessarily through, the wall. As such, the structural integrity of the wall 500 and the aircraft monument is preserved.

In additional aspects of the system, the housing 206 includes a grommet 234a surrounding the opening 207 of the back panel 232 through which the cable harness 205 extends. The grommet 234a has a maximum cross sectional dimension that enables placement of the grommet into a cable-harness hole 502 through the wall. The cable-harness hole 502 has a maximum cross sectional dimension that is small enough to preserve the structural integrity of the wall 500 and the aircraft monument. In another aspect, each of the plurality of threaded inserts 507a-d has a length less than the thickness of the wall 500.

In other aspects related to the modular power charging unit 200, the electrical port component 202 may be a charging interface, or a power and electrical power outlet. The modular power charging unit 200 may further include an indicator light electrically associated with the electrical port component 202 and configured to illuminate only when the modular power charging unit 200 is in a power on state.

Disclosed herein is a method of mounting a modular power charging unit 200 to an aircraft monument 100, 110 that is certified to withstand a load in a range of 1 g and 9 g. The method includes forming a cable-harness hole 502 through an entire thickness of a wall 500 of the aircraft monument 100, 110. The size of the cable-harness hole 502 is large enough to allow for a portion of an electrical cable harness 205 of the modular power charging unit 200 to pass through, and the size and location of the cable-harness hole preserves the structural integrity of the wall 500 and the aircraft monument 100, 110. The method further includes forming a plurality of mounting holes 506a-d only partially into the wall 500, wherein the size and location of each of the plurality of mounting holes preserves the structural integrity of the wall and the aircraft monument 100, 110; and inserting a threaded insert 507a-d in each of the plurality of mounting holes. The method also includes feeding the portion of the electrical cable harness 205 of the modular power charging unit 200 through the cable-harness hole 502. Next, the method includes, for each of a plurality of screw holes 226 of a housing 206 of the modular power charging unit 200, aligning a screw hole with a corresponding one of the plurality of threaded inserts 507a-d and inserting a mounting hardware, e.g., screw, through the screw hole and into the threaded insert; and then advancing the mounting hardware into the threaded inserts until a back panel 232 of the housing 206 is flush with a surface of the wall 500.

In additional aspects of the method, the cable-harness hole 502 is located a distance from a closest edge of the wall 500. The distance is equal to at least one times the diameter of the cable-harness hole 502. In another aspect, the threaded inserts 507a-d are formed of a rigid metal configured to provide structural support to the wall 500 in an area of the plurality of mounting holes 506a-d. In yet another aspect, the housing 206 includes a grommet 234a that projects outward from the back panel 232. The grommet 234a has a maximum cross sectional dimension d that enables placement of the grommet into the cable-harness hole 502 through the wall 500. The cable-harness hole 502 has a maximum cross sectional dimension that preserves the structural integrity of the wall 500 and the aircraft monument 100, 110.

Disclosed herein is a modular power charging unit 200 for mounting to a wall 500 of an aircraft monument 100, 110 that is certified to withstand a load in a range of 1 g and 9 g. The modular power charging unit 200 includes an electrical port component 202 having a power input terminal and a ground terminal, an electrical cable harness 205 having a power input pin and a ground pin configured to couple to an external power supply, a manually operable power switch 204 electrically interposed between the power input terminal of the electrical port component and the power input pin of the cable harness, and a housing 206 containing at least a portion of the electrical port component, the cable harness, and the manually operable switch. The manually operable power switch 204 is configured to toggle the modular power charging unit 200 between a power on state where the power input pin is electrically coupled to the power input terminal, and an off state where the power input pin is electrically decoupled from the power input terminal. The housing 206 is configured to be secured to a first side, e.g., exterior side, of the wall 500 so that the entirety of the housing projects outward from the first side.

In additional aspects, the modular power charging unit 200 also includes an indicator light electrically associated with the electrical port component 202 and configured to illuminate only when the modular power charging unit is in the power on state. In other aspects of the modular power charging unit 200, the electrical port component 202 may be a charging interface and/or an electrical power outlet.

In additional aspects of the modular power unit, the housing 206 includes a back panel 232 with an opening 207 through which the electrical cable harness 205 extends to place the power input pin and the ground pin outside of the housing. The housing 206 is secured to the wall 500 by mounting hardware, e.g., screws, that extends into mounting holes 506a-d formed in the wall so that the back panel 232 of the housing is flush with a surface of the wall. The mounting holes 506a-d may extend only partially into the wall 500. The housing 206 includes a grommet 234a surrounding the opening 207 of the back panel 232, and the grommet has a maximum cross sectional dimension d that enables placement of the grommet into a cable-harness hole 502 through the wall 500. The cable-harness hole 502 has a maximum cross sectional dimension that preserves the structural integrity of the wall 500 and the aircraft monument.

The various aspects of this disclosure are provided to enable one of ordinary skill in the art to practice the present invention. Various modifications to exemplary embodiments presented throughout this disclosure will be readily apparent to those skilled in the art. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of mounting a modular power charging unit to an aircraft monument that is certified to withstand a load in a range of 1 g-force (g) and 9 g, the method comprising:
    forming a cable-harness hole through an entire thickness of a wall of the aircraft monument, wherein a size of the cable-harness hole is configured to allow for a portion of a cable harness of the modular power charging unit to pass through, and the size and a location of the cable-harness hole preserves the structural integrity of the wall and the aircraft monument;
    forming a plurality of mounting holes in the wall, wherein a size and location of each of the plurality of mounting holes preserves the structural integrity of the wall and the aircraft monument;
    inserting a threaded insert in each of the plurality of mounting holes; feeding the portion of the cable harness of the modular power charging unit through the cable-harness hole;
    for each of a plurality of screw holes of a housing of the modular power charging unit, aligning a screw hole with a corresponding one of the plurality of threaded inserts and inserting a mounting hardware through the screw hole and into the threaded insert; and advancing the mounting hardware into the threaded inserts until a back panel of the housing is flush with a surface of the wall.

2. The method of claim 1, wherein the cable-harness hole is located a distance from a closest edge of the wall, which the distance is equal to at least one times a diameter of the cable-harness hole.

3. The method of claim 1, wherein the plurality of mounting holes extend only partially into the wall.

4. The method of claim 1, wherein each of the threaded inserts are formed of a rigid metal configured to provide structural support to the wall in an area of the plurality of mounting holes.

5. The method of claim 1, wherein the housing comprises a grommet projecting outward from the back panel and having a maximum cross sectional dimension that enables placement of the grommet into the cable-harness hole through the wall, the cable-harness hole having a corresponding maximum cross sectional dimension that preserves the structural integrity of the wall and the aircraft monument, and further comprising extending the grommet into the cable-harness hole.

6. The method of claim 1, wherein the cable-harness hole is the only hole formed through the entire thickness of the wall of the aircraft monument for purposes of mounting the modular power charging unit to the wall.

7. The method of claim 1, wherein the cable-harness hole has a diameter in the range of 1 to 3 inches.

8. The method of claim 1, wherein only the cable harness extends through the cable-harness hole formed.

9. The method of claim 1, wherein the forming a plurality of mounting holes in the wall comprises, for each mounting hole, drilling the mounting hole to a depth no greater than one times the diameter of the mounting hole.

10. The method of claim 1, wherein the housing of the modular power charging unit comprises the back panel, and the entirety of the housing projects outward from the surface of the wall when the housing is flush with the surface of the wall.

11. The method of claim 1, wherein the housing of the modular power charging unit comprises a flange with an outer edge and a grommet projecting outward from the back panel and having an outer edge defining a diameter of the grommet, and the minimum distance between the outer edge of the grommet and the outer edge of the flange is at least one times greater than the diameter of the grommet.

\* \* \* \* \*